United States Patent
Yue (10) Patent No.: US 9,154,950 B2
(45) Date of Patent: Oct. 6, 2015

(54) NETWORK ACCESS METHOD, APPARATUS AND SYSTEM

(75) Inventor: Xiaopin Yue, Shenzhen (CN)

(73) Assignee: ZTE CORPORATION (CN)

( * ) Notice: Subject to any disclaimer, the term of this patent is extended or adjusted under 35 U.S.C. 154(b) by 84 days.

(21) Appl. No.: 13/977,746

(22) PCT Filed: Mar. 4, 2011

(86) PCT No.: PCT/CN2011/071238
§ 371 (c)(1),
(2), (4) Date: Jul. 1, 2013

(87) PCT Pub. No.: WO2012/094841
PCT Pub. Date: Jul. 19, 2012

(65) Prior Publication Data
US 2013/0298196 A1 Nov. 7, 2013

(30) Foreign Application Priority Data
Jan. 10, 2011 (CN) .......................... 2011 1 0004412

(51) Int. Cl.
*H04L 29/06* (2006.01)
*H04W 12/06* (2009.01)

(52) U.S. Cl.
CPC ..................................... *H04W 12/06* (2013.01)

(58) Field of Classification Search
CPC ........................... H04L 63/0884; H04W 12/08
USPC ................. 726/3, 10; 455/406, 408, 412.2
See application file for complete search history.

(56) References Cited

U.S. PATENT DOCUMENTS

| 8,276,189 B2* | 9/2012 | Kumar et al. ....................... 726/3 |
| 2004/0246984 A1* | 12/2004 | Hundscheidt et al. ........ 370/432 |
| 2007/0211900 A1* | 9/2007 | Tan et al. ....................... 380/225 |
| 2008/0022115 A1* | 1/2008 | Mock et al. .................... 713/178 |
| 2012/0059922 A1* | 3/2012 | Jason et al. .................... 709/223 |

FOREIGN PATENT DOCUMENTS

| CN | 101159624 A | 4/2008 | |
| CN | 101321391 A | * 12/2008 | .............. H04Q 7/32 |
| CN | 101414998 A | 4/2009 | |
| WO | 2009138559 A1 | 11/2009 | |

OTHER PUBLICATIONS

International Search Report for corresponding application PCT/CN2011/071238 filed Apr. 4, 2011; Mail date Oct. 20, 2011.

* cited by examiner

*Primary Examiner* — Justin T Darrow
*Assistant Examiner* — Hee Song
(74) *Attorney, Agent, or Firm* — Cantor Colburn LLP (57) ABSTRACT

The disclosure discloses a network access method, apparatus and system. The method includes: a network side determines that a first User Equipment (UE) requests to use the account of a second UE for access; the network side determines that the account of the second UE is successfully authenticated; the network determines that the user to which the second UE belongs allows the first UE to access the network side by the account of the second UE; and the first UE accesses the network side. The disclosure can ensure the security of the master user.

9 Claims, 7 Drawing Sheets

NETWORK ACCESS METHOD, APPARATUS AND SYSTEM

FIELD OF THE INVENTION

The disclosure relates to the field of communication, and in particular to a network access method, apparatus and system.

BACKGROUND OF THE INVENTION

The Wireless Local Area Network (WLAN) is characterized by mobility and high broadband, and can meet the high-speed access requirement of a user with limited mobility. Under the full-service operation of China telecom, the breadth and depth of the coverage of the WLAN hotspot is a strategic resource against competitors, and can not only diversify means for the user to access network but also enforce the differential service capability provided by China telecom to the user based on network access.

Now, China telecom is vigorously advancing the deployment of the WLAN hotspots, meanwhile, it combines the WLAN with the Code Division Multiple Access (CDMA) network to provide the user with broadband wireless access service. With the continuous expansion of the WLAN and its service scale and the continuous abundance of WLAN User Equipments (UEs), the network and information security authentication must be taken into consideration and solved.

The conventional WLAN authentication method includes: a WLAN file is created in a smart card to store a WLAN account, and when a client terminal initiates a WLAN connection, an Attention (AT) command is sent to a data card to indicate it to read the WLAN account stored in the smart card; a multi-user WLAN access user equipment is provided with a Subscriber Identity Module (SIM) card interface; and an authentication module is configured to judge whether an access user name is stored in a storage module, if not, an authorization request is sent to a WLAN Authentication Server (AS) by the security data connection established.

In the related arts, the WLAN authentication of a UE is mostly performed by an account in a SIM card or a Universal Serial Bus (USB) KEY; and when other users access a network by the account of the master user, the master user will not be notified, therefore insecurity is possibly caused.

SUMMARY OF THE INVENTION

In order to solve the problem that the master user is not notified when other users access the network by the account of the master user in the related arts, the disclosure is provided; therefore, the main objective of the disclosure is to provide a network access method, apparatus and system to solve the problem.

To achieve the objective, according to one aspect of the disclosure, a network access method is provided.

The network access method according to the disclosure includes: a network side determines that a first UE requests to use an account of a second UE for access; the network side determines that the account of the second UE is successfully authenticated; the network side determines that the user to which the second UE belongs allows the first UE to access the network side by the account of the second UE; and the first UE accesses the network side.

The network side determines that the user to which the second UE belongs allows the first UE to access the network side by the account of the second UE includes: the network side acquires a Medium Access Control (MAC) address and/or an SIM number of the first UE; the network side sends the MAC address and/or the SIM number to the user to which the second UE belongs; the network side receives access admission information from the second UE, wherein the access admission information is used for indicating the user to which the second UE belongs to allow the first UE to access the network side by the account of the second UE; and the network side determines that the user to which the second UE belongs allows the first UE to access the network side by the account of the second UE according to the access admission information.

The network side determines that the user to which the second UE belongs allows the first UE to access the network side by the account of the second UE includes: the network side acquires the MAC address and/or the SIM number of the first UE; the network side sends the MAC address and/or the SIM number to the user to which a third UE belongs, wherein the third UE is to be allowed by the user to which the second UE belongs, and to authenticate other UEs except the second and the third UEs to access the network side by the account of the second UE; the network side receives access admission information from the third UE, wherein the access admission information is used for indicating the user to which the second UE belongs to allow the first UE to access the network side by the account of the second UE; and the network side determines that the user to which the second UE belongs allows the first UE to access the network side by the account of the second UE according to the access admission information.

The network side sends the MAC address and/or the SIM number in a form of a short message or voice prompt information through a WLAN or a Time Division-Synchronization Code Division Multiple Access (TD-SCDMA) network or an Enhanced Data rate for Global system for mobile communication (EDG) network; and the network side receives the access admission information by a short message or voice prompt information.

After the first UE accesses the network side, the method further includes: the network side notifies all UEs using the account of the second UE, of the access of the first UE in a form of a short message or voice prompt information through a WLAN or a TD-SCDMA network or an EDG network.

After the first UE accesses the network side, the method further includes: the network side determines that WLAN function of the second UE is not enabled; and the network side allows the first UE to transmit data independently.

After the first UE accesses the network side, the method further includes at least one of: data is transmitted between the network side and the first UE according to the Transmission Control Protocol (TCP); data is transmitted between the first UE and the second UE according to the User Datagram Protocol (UDP), and data is transmitted between the first UE and a third UE according to the UDP, wherein the third UE is allowed by the user to which the second UE belongs to access the network side by the account of the second UE.

The network side determines that the account of the second UE is successfully authenticated includes at least one of: the network side determines that the account of the second UE is successfully authenticated by a WLAN access device by a short message or voice prompt information; the network side determines that the account of the second UE is successfully authenticated by a provincial AS by the short message or voice prompt information; and the network side determines that the account of the second UE is successfully authenticated by a national AS by the short message or voice prompt information.

To achieve the objective, according to another aspect of the disclosure, a network access apparatus is provided, which is applied to a network side.

The network access apparatus according to the disclosure includes: a first determining module is configured to determine that a first UE requests to use the account of a second UE for access; a second determining module is configured to determine that the account of the second UE is successfully authenticated; a third determining module is configured to determine that a user to which the second UE belongs allows the first UE to access the network side by the account of the second UE; and an access module is configured to implement the access of the first UE.

To achieve the objective, according to another aspect of the disclosure, a network access system is provided.

The network access system according to the disclosure includes a first UE, a second UE and a network side, wherein the network side includes: a first determining module is configured to determine that a first UE requests to use an account of a second UE for access, a second determining module is configured to determine that the account of the second UE is successfully authenticated, a third determining module is configured to determine that the user to which the second UE belongs allows the first UE to access the network side by the account of the second UE, and an access module which is configured to implement the access of the first UE.

Through the disclosure, other users cannot access the network until the master user allows them to access the network by the account of the master user, so as to ensure the security of the master user.

BRIEF DESCRIPTION OF THE DRAWINGS

The drawings disclosed herein are provided for understanding of the disclosure, and constituting a part of this application, and the schematic embodiments of the disclosure and description thereof are used for the explanation of the disclosure rather than limiting the disclosure. In the drawings.

DETAILED DESCRIPTION OF THE EMBODIMENTS

It should be noted that, the embodiments of the disclosure and features therein can be combined with each other if no conflict occurs. The disclosure will be explained below with reference to the drawings and in conjunction with the embodiments in detail.

Figure 1:
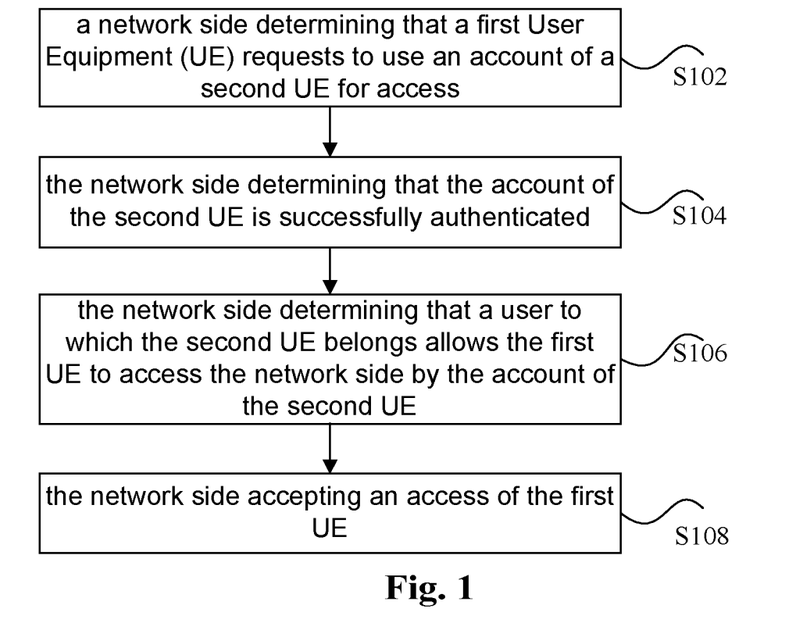
FIG. 1 is a flowchart of a network access method according to one embodiment of the disclosure.

One embodiment of the disclosure provides a network access method. FIG. 1 is a flowchart of a network access method according to one embodiment of the disclosure, as shown in FIG. 1, the method includes Step 102 to Step 108:

Step 102: A network side determines that a first UE requests to use an account of a second UE for access.

Step 104: The network side determines that the account of the second UE is successfully authenticated.

Step 106: The network side determines that the user to which the second UE belongs allows the first UE to access the network side by the account of the second UE.

Step 108: The first UE accesses the network side.

In the related arts, when other users (corresponding to the user to which the first UE belongs) access the network by the account of the master user (corresponding to the user to which the second UE belongs), the master user will not be notified and therefore insecurity is caused. In one embodiment of the disclosure, other users cannot access the network until the master user allows them to access the network by the account, so as to ensure the security of the master user.

Preferably, the step that the network side determines that the user to which the second UE belongs allows the first UE to access the network side by the account of the second UE includes: the network side acquires a MAC address and/or a SIM number of the first UE; the network side sends the MAC address and/or the SIM number to the user to which the second UE belongs; the network side receives access admission information from the second UE, wherein the access admission information is used for indicating the user to which the second UE belongs to allow the first UE to access the network side by the account of the second UE; and the network side determines that the user to which the second UE belongs allows the first UE to access the network side by the account of the second UE according to the access admission information.

Preferably, the network side determines that the user to which the second UE belongs allows the first UE to access the network side by the account of the second UE includes: the network side acquires the MAC address and/or the SIM number of the first UE; the network side sends the MAC address and/or the SIM number to the user to which a third UE belongs, wherein the third UE is to be allowed by the user to which the second UE belongs, and to authenticate other UEs except the second and third UEs to access the network side by the account of the second UE; the network side receives access admission information from the third UE, wherein the access admission information is used for indicating the user to which the second UE belongs to allow the first UE to access the network side by the account of the second UE; and the network side determines that the user to which the second UE belongs allows the first UE to access the network side by the account of the second UE according to the access admission information.

Preferably, the network side sends the MAC address and/or the SIM number by a short message or voice prompt information through a WLAN or a TD-SCDMA network or an EDG network; and the network side receives the access admission information by a short message or voice prompt information.

Preferably, after the first UE accesses the network side, the method further includes: the network side notifies all UEs using the account of the second UE, of the access of the first UE in the form of a short message or voice prompt information through a WLAN or a TD-SCDMA network or an EDG network.

Preferably, after the first UE accesses the network side, the method further includes: the network side determines that the WLAN function of the second UE is not enabled; and the network side allows the first UE to transmit data independently.

Preferably, after the first UE accesses the network side, the method further includes at least one of: data is transmitted between the network side and the first UE according to the TCP (i.e., an external data transmission mode); data is transmitted between the first UE and the second UE according to the UDP (i.e., an internal data transmission mode), and data is transmitted between the first UE and the third UE according to the UDP, wherein the third UE is allowed by the user to which the second UE belongs to access the network side by the account of the second UE.

Specifically, in the external data transmission mode, all the users passing the authentication are allowed to perform the external data transmission by the TCP, both the data traffic and counting of all the sharing users are calculated by the account of the master user, if the users sharing the account are in a roaming state, their counting is calculated according to the standard of roaming; and in the internal data transmission mode, all the sharing users perform the internal data transmission by the UDP, which does not belong to the link protocol and consumes less resources and has a fast data process speed. The network notifies the master user of the internal data traffic in order to count it, and if the internal data transmission mode is free, the internal data traffic will not be counted.

Preferably, the network side determines that the account of the second UE is authenticated successfully includes at least one of: the network side determines that the account of the second UE is successfully authenticated by a WLAN access device by the short message or the voice prompt information; the network side determines that the account of the second UE is successfully authenticated by a provincial authentication server (AS) by the short message or the voice prompt information; and the network side determines that the account of the second UE is successfully authenticated by a national AS by the short message or the voice prompt information.

The implementations of the embodiment of the disclosure will be described below in detail in conjunction with examples.

Figure 2:
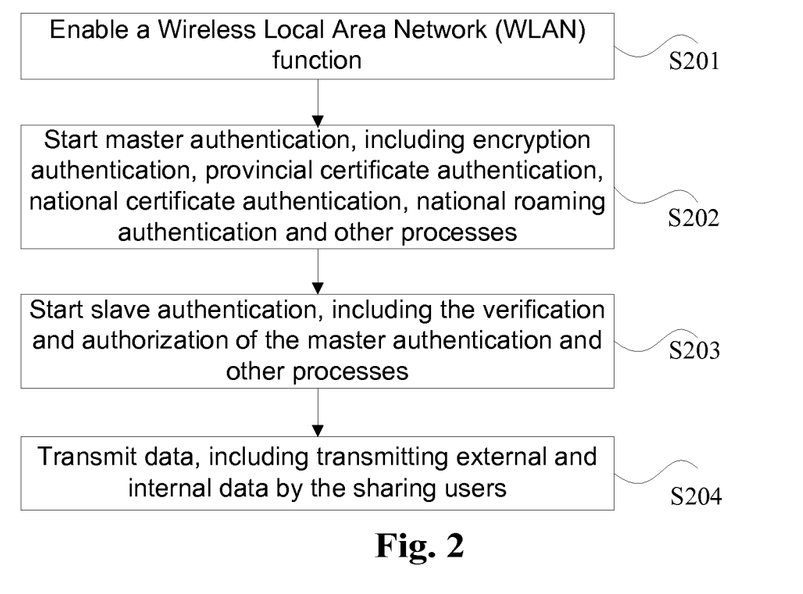
FIG. 2 is a flowchart of the authentication and transmission process of a WLAN according to one embodiment of the disclosure.

FIG. 2 is a flowchart of the authentication and transmission process of a WLAN according to one embodiment of the disclosure, as shown in FIG. 2, the process includes Step 201 to Step 204 as follows:

Step 201: Enabling the WLAN function by the master user to prepare to initiate active authentication or passively accept the authentication of the authentication server.

Step 202: Starting the master user authentication process, mainly including: confirming the encryption information between master user and the WLAN access point, provincial AS and/or national AS, and monitoring and verifying the master user by the provincial and national certificate management centres, specifically as shown in FIG. 3.

Figure 4:
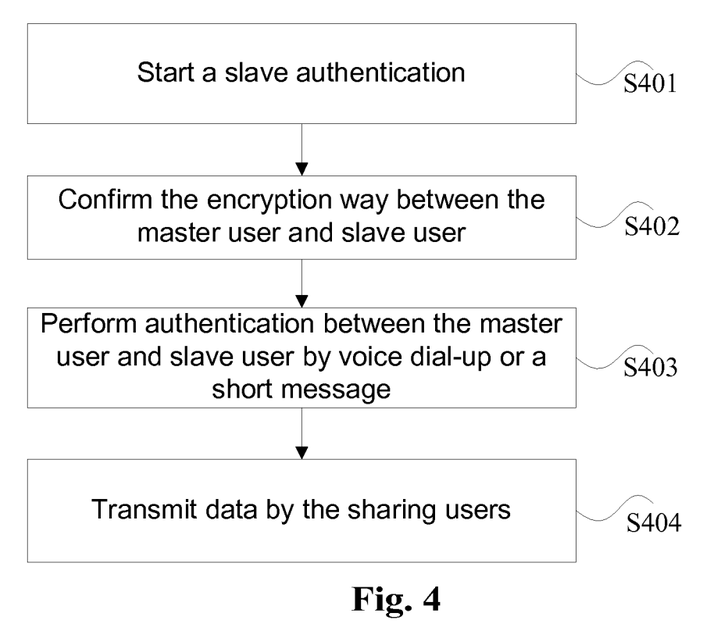
FIG. 4 is a flowchart of the authentication process of a slave user of a WLAN according to one embodiment of the disclosure.

Step 203: Starting the slave authentication process, which is completed by the verification of the master user to mainly realize the security reminder and protection function, for using the account of the master user, specifically as shown in FIG. 4.

Step 204: Transmitting data, specifically, after the master user and slave user being successfully authenticated, all the sharing users can access an external network by the account of the WLAN and can perform internal data transmission by the WLAN therebetween.

Figure 3:
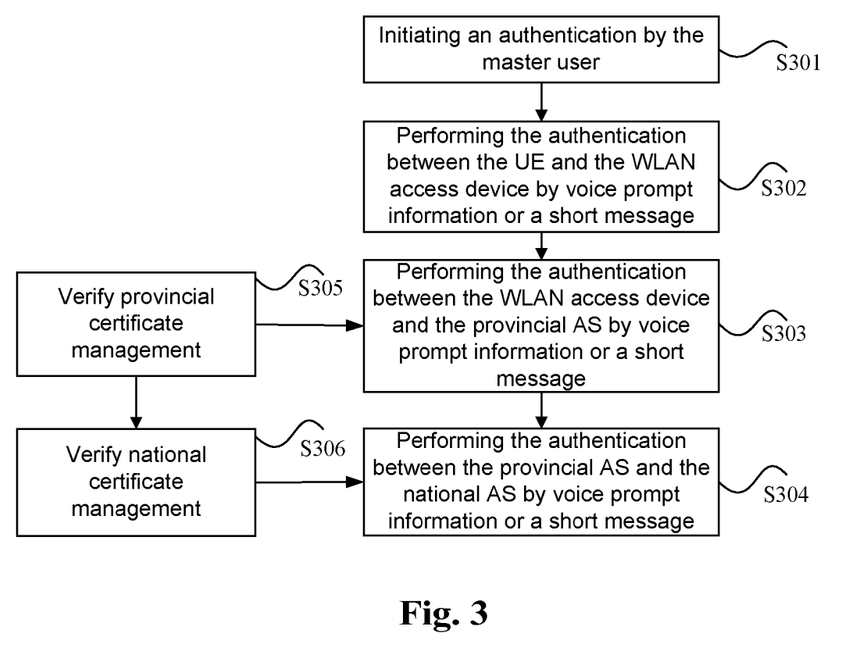
FIG. 3 is a flowchart of the authentication process of the master user of a WLAN according to one embodiment of the disclosure.

FIG. 3 is a flowchart of the authentication process of the master user of a WLAN according to one embodiment of the disclosure, as shown in FIG. 3, the process includes Step 301 to Step 304 as follows:

Step 301: Initiating an authentication by the master user, specifically, the master user can passively accept the authentication of the authentication server, the master user initiates an authentication request to the WLAN access point by voice prompt information or a short message; wherein the dial-up authentication of the master user supports a non-card dial-up authentication, a UE can register to an authentication system by calling the WLAN access point in case of no card, if the UE is located within the province of the registration place of the account, only the provincial authentication is required, and if the UE is located outside the province of the registration place of the account, the national dial-up authentication is further required after the provincial authentication.

Step 302: Performing the authentication between the UE and the WLAN access device by voice prompt information or a short message.

Step 303: Performing the authentication between the WLAN access device and the provincial AS by voice prompt information or a short message.

Step 304: Performing the authentication between the provincial AS and the national AS by voice prompt information or a short message.

Step 305: Monitoring and verifying the authentication process between the WLAN access device and the provincial AS by the provincial certificate management system.

Step 306: Monitoring and verifying the authentication process between the provincial AS and the national AS by the national certificate management system.

FIG. 4 is a flowchart of the authentication process of a slave user of a WLAN according to one embodiment of the disclosure, as shown in FIG. 4, the process includes Step 401 to Step 404 as follows:

Step 401: Initiating an authentication by the slave user, specifically, the slave user can passively accept the authentication request of the master user and initiates an authentication request to the master user by voice prompt information or a short message; wherein, when an unknown user accesses the network by the account of the master user, the network side will feed the MAC address or the SIM card number of the access UE back to the master user by a short message or voice prompt information, and the master user finishes the operation of allowing or refusing the access of the access UE.

Step 402: Confirming the data encryption mode between the slave user and the master user, specifically, in the confirmation process of the data encryption mode initiated by the slave user, if the master user does not enable the WLAN function, the master user is notified by a Time Division (TD) network or an EDG network.

Step 403: Performing the authentication between the slave user and master user, specifically, after the authentication of the slave user is confirmed by the master user, the slave user can access an external network independently if the master user does not enable the WLAN function; and after the slave user is authenticated by the master user, the master user can authorize the slave user to perform authentication, i.e., when a new user intends to share the account, the slave user which is authorized in authentication can allow the access of the new user.

Step 404: Transmitting data by all sharing users, specifically, after being successfully authenticated by the master and the slave user, all the sharing users can access an external network synchronously by the TCP data transmission mode, and the sharing internal users adopt the UDP data transmission mode.

The network access method in the embodiment of the disclosure is further described below.

The link disconnection process of the master authentication includes: encryption authentication, provincial certificate authentication, national certificate authentication, national roaming authentication and other processes; and the slave authentication process includes: the verification and authorization of the master authentication and other processes.

Wherein, the master authentication system includes an authentication encryption system and a certificate management system, wherein the authentication encryption system consists of a UE, a WLAN access device and an AS; and the certificate management system includes a national certificate management centre, and a provincial registration verification centre, and is responsible for the issue and management of the certificate, specifically including:

the master user confirms the encryption mode with the WLAN access device by dial-up or a short message, the WLAN access device transmits the dial-up or the short message to the provincial AS, the then the provincial AS transmits the dial-up or the short message to the national AS, and the national AS creates an information document library for the master user and establishes a user-defined key with the UE by an encrypted voice communication or a short message channel, wherein the key can be used for the password recovery of the user;

after the master user completely establishes the key, the provincial certificate management center automatically verifies the security of the voice prompt information or the short message of the master user at first, and then submits it to the national certificate management centre, and the national certificate management centre creates an auto-dialling or a short message authentication information document library after verifying it; and meanwhile, the certificate management system issues an AS device certificate for the AS, a WLAN device certificate for the WLAN access device, and a UE certificate for the UE, the certificates of the UE and the WLAN access device are mutually authenticated by the AS, and the master UE accesses the network through the WLAN access device and implements data encryption at an air interface.

Wherein, the confirmation of encryption mode and the process of link and disconnection in authentication between the slave user and master user are performed by dial-up or a short message, the confirmation of encryption mode and the authentication process between the master user and slave user can be initiated either by the master user or the slave user;

the encryption mode between the slave user and master user is required to be consistent with that between the master user and the WLAN access point, and the master user, after authenticating the slave user, does not need to report it to an upper-layer authentication system, to which all the sharing users display a unified encryption mode and authentication account; and when the slave user attempts to access the WLAN by the account of the master user, the Access Point (AP) nearest to the slave user will automatically search for the MAC address of the slave user or the SIM card number of the UE used by the slave user, and notify the master user of it in the form of a short message or voice prompt information through a WLAN or a non-WLAN. The master user allows or refuses the access of the slave user according to the short message or the voice prompt information. After the master user authorizes a new user to access the WLAN by the account of the master user, the network side will notify all the users sharing the account of the access of the new user in the form of the short message or the voice prompt information through the WLAN or the non-WLAN.

It should be noted that the steps shown in the flowchart of the drawings can be executed, for example, in the computer system of a set of instructions executable by a computer, in addition, a logic order is shown in the flowchart, but the shown or described steps can be executed in a different order under some conditions.

Figure 5:
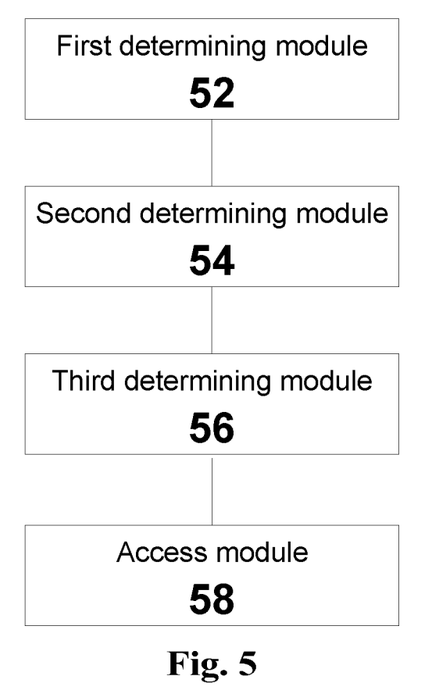
FIG. 5 is a block diagram showing the structure of a network access apparatus according to one embodiment of the disclosure.

One embodiment of the disclosure provides a network access apparatus, which can be configured to implement the network access method. FIG. 5 is a block diagram showing the structure of the network access apparatus according to the embodiment of the disclosure, including a first determining module 52, a second determining module 54, a third determining module 56 and an access module 58, which are described below in detail.

The first determining module 52 which is configured to determine that a first UE requests to use the account of a second UE for access; the second determining module 54 which is configured to determine that the account of the second UE is successfully authenticated; the third determining module 56 which is configured to determine that the user to which the second UE belongs allows the first UE to access the network side by the account of the second UE; and the access module 58 which is configured to implement the access of the first UE.

The implementations of the embodiment of the disclosure will be described below in detail in conjunction with examples.

Figure 6:
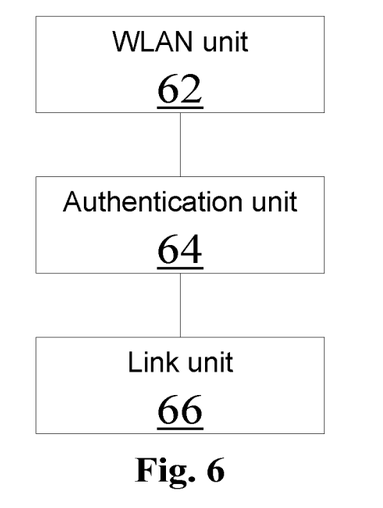
FIG. 6 is a block diagram showing the structure of a network access apparatus according to a preferred embodiment of the disclosure.

FIG. 6 is a block diagram showing the structure of a network access apparatus according to a preferred embodiment of the disclosure, as shown in FIG. 6, the apparatus includes: a WLAN unit 62, an authentication unit 64 and a link unit 66, which are described below in detail.

The WLAN unit 62 which is configured to enable and disable the WLAN function, search for, link, set and arrange an access point, and implement other basic operation of the access point, moreover, it is further configured to exchange information with the authentication unit 64, and timely feed back the authentication information.

The authentication unit 64 which is configured to perform system encryption authentication and management certificate authentication, wherein the management certificate authentication includes: provincial management certificate authentication, national management certificate authentication, national roaming certificate authentication, and other certificate authentication processes, and further configured to exchange information with the link unit 66 and provide the link unit 66 with a link authority certificate.

The authentication unit 64 includes: a master user authentication unit and a slave user authentication unit, wherein the master user authentication unit is configured to receive the certificate of the UE issued by the certificate management system, and provide the certificates of the UE and WLAN access device mutually authenticated by the AS; and the slave user authentication unit is configured to authenticate the users sharing the same account, and mainly to notify the master user timely by the network side in order to realize the security reminder and protection function for the account of the master user when other users attempt to access the WLAN by the account of the master user.

The link unit 66 which is configured to receive the authentication result information of the authentication unit 64 and give a corresponding user the link authority according to the authentication result information.

The link unit 66 which is further configured to control the authority of a browser, including configuring and monitoring the link authority and link process of the master user and the slave user, and is further configured to establish, monitor and disconnect the link of the internal data transmission of the sharing users.

It should be noted that the network access apparatus described in the apparatus embodiment corresponds to the method embodiment, with the specific implementation described in the method embodiment in detail, thereby needing no further description.

Figure 7:
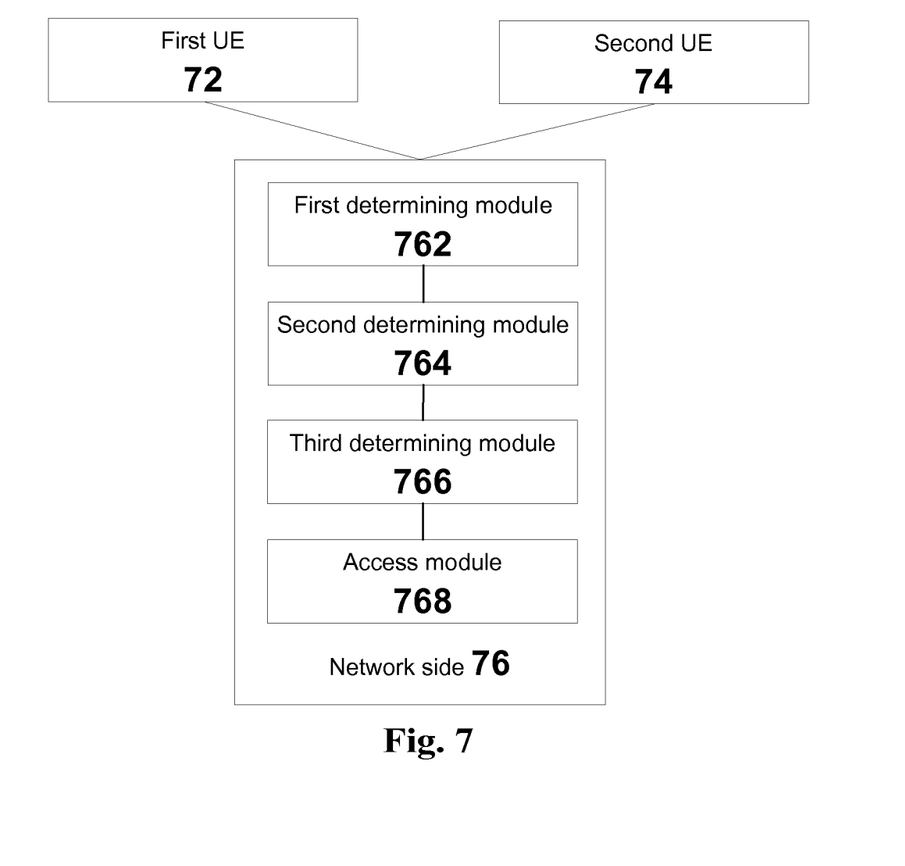
FIG. 7 is a block diagram showing the structure of a network access system according to one embodiment of the disclosure.

One embodiment of the disclosure provides a network access system, which can be configured to implement the network access method. FIG. 7 is a block diagram showing the structure of the network access system according to the embodiment of the disclosure, as shown in FIG. 7, the system includes: a first UE 72, a second UE 74 and a network side 76, wherein the network side 76 includes: a first determining module 762, a second determining module 764, a third determining module 766 and an access module 768, which are described below in detail.

The first determining module 762, is configured to determine that the first UE 72 requests to use the account of the second UE 74 for access; the second determining module 764, is configured to determine that the account of the second UE 74 is successfully authenticated; the third determining module 766, is configured to determine that the user to which the second UE 74 belongs allows the first UE 72 to access the network side by the account of the second UE 74; and the access module 768, is configured to implement the access of the first UE 72.

It should be noted that the network access system described in the apparatus embodiment corresponds to the method embodiment, with the specific implementation described in the method embodiment in detail, thereby needing no further description.

To sum up, according to the embodiments, a network access method, apparatus and system are provided. Through the disclosure, other users cannot access the network until the master user allows them to access the network by the account, so as to ensure the security of the master user.

Obviously, those skilled in the art shall understand that each module or step of the disclosure may be implemented by general computing devices and centralized in a single computing device or allocated in a network consisting of multiple computing devices. Optionally, the modules or steps may be implemented by program codes executable by the computing devices, so that they may be stored in a storage device to be executed by the computing device, or respectively made into integrated circuit modules or a single integrated circuit module. By doing so, the disclosure is not limited to any specific combination of hardware and software.

The description above is only preferred embodiments of the disclosure and not used for limiting the disclosure. For those skilled in the art, the disclosure may have various modifications and changes. Any modifications, equivalent replacements, improvements and the like within the spirit and principle of the disclosure shall fall within the scope of protection of the disclosure.

What is claimed is:

1. A network access method, comprising:
    a network side determining that a first User Equipment (UE) requests to use an account of a second UE for access;
    the network side determining that the account of the second UE is successfully authenticated;
    the network side receiving access admission information from a third UE and determining that a user to which the second UE belongs allows the first UE to access the network side by the account of the second UE according to the access admission information, wherein the third UE is to be allowed by the user to which the second UE belongs, and to authenticate other UEs except the second and third UEs to access the network side by the account of the second UE; and
    the network side accepting an access of the first UE.

2. The method according to claim 1, wherein the network side determining that the user to which the second UE belongs allows the first UE to access the network side by the account of the second UE comprises:
    the network side acquiring the MAC address and/or the SIM number of the first UE;
    the network side sending the MAC address and/or the SIM number to the user to which a third UE belongs;
    the network side receiving access admission information from the third UE, wherein the access admission information is used for indicating the user to which the second UE belongs to allow the first UE to access the network side by the account of the second UE; and
    the network side determining that the user to which the second UE belongs allows the first UE to access the network side by the account of the second UE according to the access admission information.

3. The method according to claim 2, wherein,
    the network side sending the MAC address and/or the SIM number in a form of a short message or voice prompt information through a Wireless Local Area Network (WLAN) or a Time Division-Synchronization Code Division Multiple Access (TD-SCDMA) network or an Enhanced Data rate for Global system for mobile communication (EDG) network; and
    the network side receiving the access admission information by a short message or voice prompt information.

4. The method according to claim 1, wherein after the first UE accesses the network side, the method further comprises:
    the network side notifying all UEs using the account of the second UE, of the access of the first UE in a form of a short message or voice prompt information through a WLAN or a TD-SCDMA network or an EDG network.

5. The method according to claim 1, wherein after the first UE accesses the network side, the method further comprises:
    the network side determining that WLAN function of the second UE is not enabled; and
    the network side allowing the first UE to transmit data independently.

6. The method according to claim 1, wherein after the first UE accesses the network side, the method further comprises at least one of:
    transmitting data between the network side and the first UE according to the Transmission Control Protocol (TCP);
    transmitting data between the first UE and the second UE according to the User Datagram Protocol (UDP); and
    transmitting data between the first UE and a third UE according to the UDP, the third UE being allowed by the user to which the second UE belongs to access the network side by the account of the second UE.

7. The method according to claim 1, wherein the network side determining that the account of the second UE is successfully authenticated comprises at least one of:

the network side determining that the account of the second UE is successfully authenticated by a WLAN access device by a short message or voice prompt information;

the network side determining that the account of the second UE is successfully authenticated by a provincial Authentication Server (AS) by a short message or voice prompt information; and the network side determining that the account of the second UE is successfully authenticated by a national AS by a short message or voice prompt information.

8. A network access apparatus, applied to a network side, comprising a hardware processor configured to execute program units stored on a memory, the program units comprising:

a first determining module, configured to determine that a first UE requests to use an account of a second UE for access;

a second determining module, configured to determine that the account of the second UE is successfully authenticated;

a third determining module, configured to receive access admission information from a third UE and determine that a user to which the second UE belongs allows the first UE to access the network side by the account of the second UE according to the access admission information, wherein the third UE is to be allowed by the user to which the second UE belongs, and to authenticate other UEs except the second and third UEs to access the network side by the account of the second UE; and an access module, configured to implement the access of the first UE.

9. A network access system, comprising a first UE, a second UE and a network side, wherein the network side comprises a hardware processor configured to execute program units stored on a memory, the program units comprising:

a first determining module, configured to determine that the first UE requests to use an account of a second UE for access;

a second determining module, configured to determine that the account of the second UE is successfully authenticated;

a third determining module, configured to receive access admission information from a third UE and determine that a user to which the second UE belongs allows the first UE to access the network side by the account of the second UE according to the access admission information, wherein the third UE is to be allowed by the user to which the second UE belongs, and to authenticate other UEs except the second and third UEs to access the network side by the account of the second UE; and an access module, configured to implement the access of the first UE.

* * * * *